Patented Feb. 2, 1932

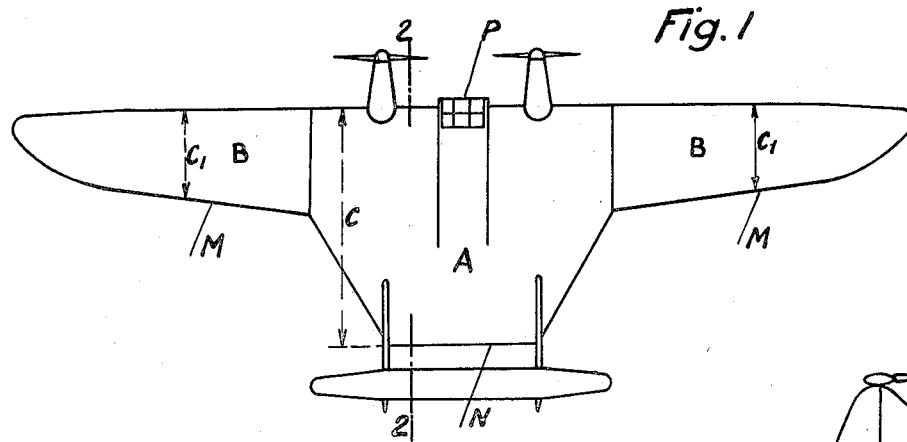
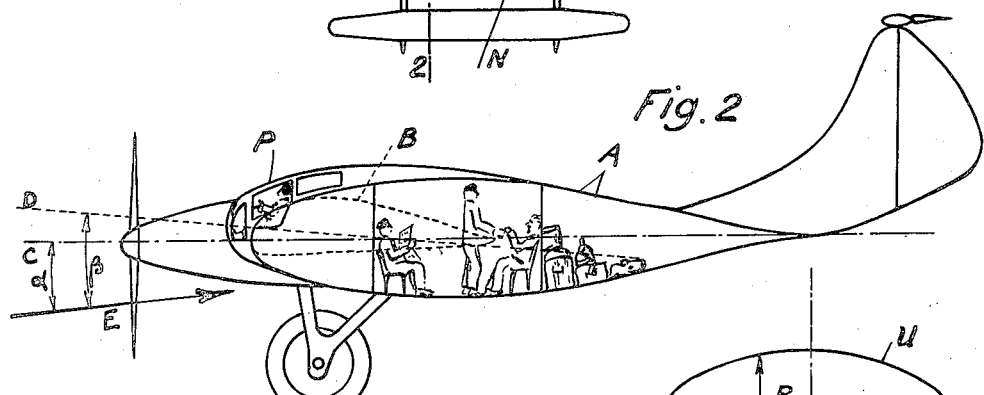
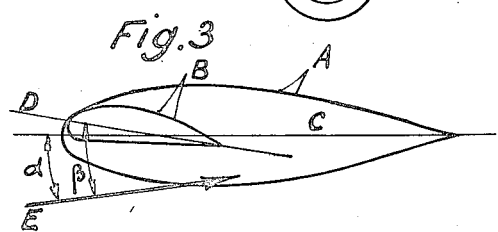
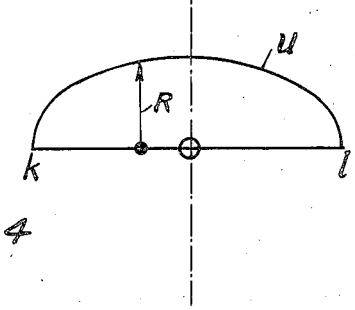
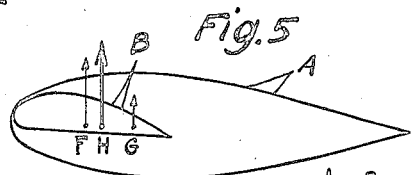
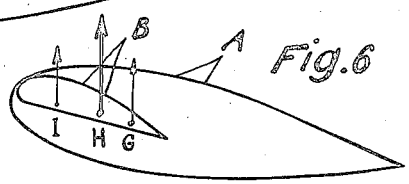
Marcel Jannin
INVENTOR;

1,843,678

UNITED STATES PATENT OFFICE

MARCEL JANNIN, OF MEUDON, FRANCE

AEROPLANE

Application filed March 28, 1930, Serial No. 439,669, and in France April 9, 1929.

The present invention relates to improvements in aeroplanes for long distance flights and more particularly monoplane aeroplanes.

Its object in particular is to provide aeroplanes offering low resistance to forward movement by diminution of parasitic drag whilst retaining but small induced drag.

It also has for its object to reduce the engine power and in consequence the weight of the engine and of its accessories as well as the consumption of fuel during flight of the aeroplanes, which has the effect of increasing their radius of action.

Finally the invention has for its object to provide an arrangement of supporting surface accommodating tail planes of small dimensions and located immediately behind the wing without insufficiency of stability of the aeroplane resulting.

An aeroplane enabling the above objects to be effected has the features set forth in the following description and particularly in the claims annexed to the end thereoef.

An aeroplane of the preferred form of the invention is illustrated on the accompanying drawings, in which:—

Fig. 1 is a diagrammatic plan of the aeroplane.

Fig. 2 is a diagrammatic section of an aeroplane along the line 2—2 of Fig. 1 and demonstrating the habitability of the central wing of the aeroplane and the form of the pilot's cockpit.

Fig. 3 is a diagrammatic view showing the angular difference between the profiles of the central wing and of the lateral wings.

Fig. 4 is an explanatory diagram.

Fig. 5 is a diagrammatic view showing the action of the air when the aeroplane is flying at great speed.

Fig. 6 is another diagrammatic view showing the action of the air on the wing when the speed of the aeroplane diminishes.

The aeroplane in the preferred form of the invention has a monoplane wing. This wing comprises three main portions in the direction of spread.

1. A central portion A the profile of which has a very large chord C and a very great thickness; moreover the profile adopted for this central portion does not present displacements of the centre of thrust when the angle of incidence varies, which is the case for a symmetric biconvex profile shown in the drawings.

2. Two lateral portions B of a chord $C^1$ much slighter and constituted like ordinary wings.

The thickness of the central portion A of the wing should enable the engines, fuel, load, crew and passengers to be located therein. As a result the usual fuselage is dispensed with.

The lateral portions B of the wing are situated in front of the central region in such manner that the trailing edge M of the two lateral portions is situated very much in advance of the trailing border N of the central region, as indicated in Fig. 1. This arrangement is adopted in such manner that the centre of thrust relative to the two lateral wings B is in advance of the centre of thrust on the central wing A for all usual angles of flight.

The pilot's cockpit P has a special form conforming as closely as possible to the profile of the central wing A (Fig. 2).

Fig. 3 shows the tapering of the different profiles of the wing. In this figure, E denotes the direction of the relative speed, C represents the direction of zero bearing on the central wing A, D is the direction of zero bearing on the lateral wings B, $\alpha$ and $\beta$ are respectively the angles of incidence relatively to the central wing and to the lateral wings. The angle $\beta$ is greater than the angle $\alpha$. In practice there will be an advantage ir giving the angular difference $(\beta - \alpha)$ a value comprised between 2° and 5°.

This latter arrangement ensures the aeroplane two great advantages:

Firstly it enables an aeroplane to be had having a small induced drag because the difference between the chords $C\ C^1$ (Fig. 1) of the profiles compensates their difference of angles of incidence $\alpha$ and $\beta$ in the condition of economical flight. It therefore follows that to this régime the bearing along the spread follows the elliptic law, which, as is well known corresponds to the minimum of induced drag.

(If the wing is shown in front view (Fig. 4) assuming it to be reduced to its mean line passing from the one extremity $k$ to the other extremity $l$ of the spread, it is necessary in order to have the minimum of induced drag that the curve U representing the vertical reactions R of the air at each point of the wing, presents appreciably the form of a semi-ellipse.)

In addition the wing admits of a centre of thrust almost entirely stationary by virtue of the angular difference of the profiles and to the form of the wing in plan. Fig. 5 represents the action of the air on the wing at a slight angle of incidence corresponding to a high speed. The lateral wings B are much more supportive than the central region A in consequence of the angular difference of the profiles. The centre of thrust is at F on the lateral wings B and at G on the central portion A. The resultant centre of thrust is at H.

Fig. 6 indicates what happens when the angle of incidence increases, and therefore when the speed diminishes. The centre of thrust G on the central portion A scarcely moves at all in consequence of the profile adopted for such central portion A. The centre of thrust on the lateral wings is displaced towards the front and arrives at I. As a result of the angular difference of the profiles the fraction of the total weight supported by the central region increases whereas that corresponding to the lateral wings diminishes; the result is that the resultant centre of thrust H remains approximately stationary.

The aeroplane, the wing of which satisfies the above conditions, has the following advantages:

The resistance to forward progress of the aeroplane is small because the parasitic drag of the fuselage is suppressed, the induced drag is small at the angle of economical flight and the tail planes and their mounting present reduced dimensions.

The dead weight is but slight by reason of the economy in weight which it is possible to effect in the fuselage, engine and tail planes. In effect the suppression of the fuselage permits a saving in weight; the small resistance to forward progress enables the engine power to be reduced and therefore a reduction in weight of the engine and of its accessories and also in the consumption of fuel during flight. Finally the resultant centre of thrust H of the lateral portions and of the central portion of the wing being approximately fixed allows the use of small light tail planes and close to the wing.

Thus an aeroplane is provided the efficiency of which is high by reason of its reasonable dead weight permitting a large useful load and its small resistance to forward progress ensuring it a reduced fuel consumption and the possibility of a large radius of action.

I claim:

1. In an aircraft such as a monoplane, a wing comprising a central habitable part of large chord and two lateral parts of smaller chord, presenting a profile different in angularity with relation to the profile of the central part, the centre of pressure relative to the lateral parts always being in advance of the centre of pressure relative to the central part whatever may be the angle of incidence of the aircraft, while the centre resultant of pressure remains fixed, whereby the longitudinal stability of the aircraft in all positions of flight is assured.

2. In an aircraft such as a monoplane, a wing comprising a central habitable part of large chord and of a profile having a fixed centre of pressure and two lateral parts of smaller chord, presenting a profile different in angularity with relation to the profile of the central part, the centre of pressure relative to the lateral parts always being in advance of the fixed centre of pressure relative to the central part whatever may be the angle of incidence of the aircraft, while the centre resultant of pressure remains fixed, whereby the longitudinal stability of the aircraft in all positions of flight is assured.

3. In an aircraft such as a monoplane, a wing comprising a habitable central part of large chord, of biconvex symmetrical profile and having a fixed centre of pressure, and two lateral parts of smaller chord presenting a profile different in angularity with relation to the profile of the central part, the centre of pressure relative to the lateral parts always being in advance of the fixed centre of pressure relative to the central part, whatever may be the angle of incidence of the aircraft, while the centre resultant of pressure remains fixed, whereby the longitudinal stability of the aircraft in all positions of flight is assured.

4. In an aircraft such as a monoplane, a wing comprising a habitable central part of large chord and two lateral parts of smaller chord presenting a profile different in angularity with relation to the profile of the central part, the centre of pressure relative to the lateral parts always being in advance of the centre of pressure relative to the central part whatever may be the angle of incidence of the aircraft, the edge of incidence of the lateral parts being substantially in line with the edge of incidence of the central part to maintain the centre of pressure relative to the lateral parts of the wing in the forward region of the aircraft, while the centre resultant of pressure remains fixed, whereby the longitudinal stability of the aircraft in all positions of flight is assured.

5. In an aircraft such as a monoplane, a wing comprising a habitable centre part of large chord and two lateral parts of smaller chord, presenting a profile different in angularity with relation to the profile of the central part, the centre of pressure relative to the lateral parts always being in advance of the centre of pressure relative to the central part whatever may be the angle of incidence of the aircraft, the edge of incidence of the lateral parts being substantially in line with the edge of incidence of the central part, the trailing edges of the lateral parts being in advance in the direction of flight with relation to the trailing edge of the central part to maintain the centre of pressure relative to the lateral parts of the wing in the forward region of the aircraft, while the centre resultant of pressure remains fixed, whereby the longitudinal stability of the aircraft in all positions of flight is assured.

6. In an aircraft such as a monoplane, a wing comprising a habitable central part of large chord and two lateral parts of smaller chord, presenting a profile differing in angularity in relation to the profile of the central part, the centre of pressure relative to the lateral parts always being in advance of the centre of pressure relative to the central part whatever may be the angle of incidence of the aircraft, the edge of incidence of the lateral parts being substantially in line with the edge of incidence of the central part, the trailing edges of the lateral parts being in advance in the direction of flight in relation to the trailing edge of the central part whereby the variation of buoyancy lengthwise of the wing span follows the elliptic law of the angle of economic flight which corresponds to the minimum of induced resistance, and the centre resultant of pressure remains fixed thus assuring the longitudinal stability of the aircraft in all positions of flight.

In testimony whereof I have signed this specification.

MARCEL JANNIN.